US011088520B2

(12) United States Patent
Price et al.

(10) Patent No.: US 11,088,520 B2
(45) Date of Patent: Aug. 10, 2021

(54) SAFETY COVER FOR ELECTRICAL BOX MOUNTED DEVICE AND METHODS THEREOF (71) Applicant: Price & Parker Products, Inc., Eldersburg, MD (US)

(72) Inventors: Eric Price, Eldersburg, MD (US); Vance Parker, District Heights, MD (US)

(73) Assignee: Price & Parker Products, Inc., Eldersburg, MD (US)

( * ) Notice: Subject to any disclaimer, the term of this patent is extended or adjusted under 35 U.S.C. 154(b) by 56 days.

(21) Appl. No.: 16/262,036

(22) Filed: Jan. 30, 2019

(65) Prior Publication Data
US 2020/0244057 A1 Jul. 30, 2020

(51) Int. Cl.
*H02G 3/14* (2006.01)
*H01B 17/38* (2006.01)
*H01B 17/24* (2006.01)

(52) U.S. Cl.
CPC ............... *H02G 3/14* (2013.01); *H01B 17/24* (2013.01); *H01B 17/38* (2013.01)

(58) Field of Classification Search
CPC ........ H01B 17/24; H01B 17/38; H02G 3/086; H02G 3/14
See application file for complete search history.

(56) References Cited

U.S. PATENT DOCUMENTS

| | | | | | |
|---|---|---|---|---|---|
| 2,820,842 | A | * | 1/1958 | Meistrell | H01R 13/4532 174/67 |
| 2,855,578 | A | * | 10/1958 | Hirsch | H01R 13/447 439/38 |
| 2,916,733 | A | * | 12/1959 | Hirsch | H01R 13/447 340/545.2 |
| 2,988,242 | A | * | 6/1961 | Kneip | H01R 13/447 220/242 |
| 3,489,242 | A | * | 1/1970 | Gladding | E04B 1/84 181/208 |
| 3,732,524 | A | * | 5/1973 | Reed | H01R 25/006 439/142 |
| 3,865,456 | A | * | 2/1975 | Dola | H01R 13/4534 439/137 |
| 4,070,078 | A | * | 1/1978 | Chrones | H01R 13/447 174/67 |
| 4,163,137 | A | * | 7/1979 | Close, Jr. | H02G 3/123 174/66 |
| 4,265,365 | A | * | 5/1981 | Boteler | H02G 3/088 174/53 |
| 4,293,173 | A | * | 10/1981 | Tricca | H01R 13/443 174/67 |
| 4,442,647 | A | * | 4/1984 | Olsen | B64C 1/40 244/119 |
| 4,484,021 | A | * | 11/1984 | Schaefer | H02G 3/18 174/53 |
| 4,616,104 | A | * | 10/1986 | Lindsey | H02G 3/125 174/503 |

(Continued)

*Primary Examiner* — Timothy J Thompson
*Assistant Examiner* — Rhadames Alonzo Miller
(74) *Attorney, Agent, or Firm* — Berenato & White, LLC (57) ABSTRACT

The present invention relates to a safety cover for an electrical box mounted device. The safety cover is configured to be mounted between the device and a face plate to prevent access to exposed wires and energized terminals inside the electrical box when the face plate is removed.

19 Claims, 7 Drawing Sheets

(56) References Cited

U.S. PATENT DOCUMENTS

| | | | | |
|---|---|---|---|---|
| 4,642,418 A * | 2/1987 | Menchetti | | H02G 3/14 174/503 |
| 4,667,840 A * | 5/1987 | Lindsey | | H02G 3/125 174/504 |
| 4,794,207 A * | 12/1988 | Norberg | | H02G 3/125 174/505 |
| 4,835,343 A * | 5/1989 | Graef | | H02G 3/14 174/66 |
| 4,895,527 A * | 1/1990 | Brown | | H01R 13/447 439/147 |
| 4,899,019 A * | 2/1990 | Riceman | | H01R 13/447 174/67 |
| 4,972,045 A * | 11/1990 | Primeau | | H01H 15/10 174/66 |
| 4,981,439 A * | 1/1991 | Piedmont | | H01R 13/447 174/67 |
| 5,004,115 A * | 4/1991 | L'Heureux | | H02G 3/123 220/3.3 |
| 5,045,640 A * | 9/1991 | Riceman | | H01R 13/447 174/67 |
| 5,087,796 A * | 2/1992 | Norman | | H02G 3/14 174/67 |
| 5,111,627 A * | 5/1992 | Brown | | E04F 15/024 52/126.5 |
| 5,122,071 A * | 6/1992 | Pridgeon | | H01R 13/447 174/67 |
| 5,174,773 A * | 12/1992 | Jones | | H01R 13/447 174/67 |
| 5,218,169 A * | 6/1993 | Riceman | | H01R 13/447 174/67 |
| 5,343,713 A * | 9/1994 | Okabe | | G10K 11/17881 62/296 |
| 5,413,501 A * | 5/1995 | Munn | | H01R 13/68 439/488 |
| 5,456,373 A * | 10/1995 | Ford | | H02G 3/14 220/230 |
| 5,477,010 A * | 12/1995 | Buckshaw | | H02G 3/14 174/67 |
| 5,496,389 A * | 3/1996 | Wilcox | | B01D 46/0002 55/473 |
| 5,556,289 A * | 9/1996 | Holbrook, Jr. | | H01R 13/447 174/67 |
| 5,906,287 A * | 5/1999 | Kohnen | | H02G 3/14 206/223 |
| 5,998,735 A * | 12/1999 | Patterson, Jr. | | H02G 3/14 174/67 |
| 6,051,788 A * | 4/2000 | Nichols | | H01R 13/443 174/67 |
| 6,252,167 B1 * | 6/2001 | Rose | | H02G 3/088 174/66 |
| 6,309,239 B1 * | 10/2001 | Johnston | | H01R 13/447 174/67 |
| 6,355,885 B1 | 3/2002 | Rintz et al. | | |
| 6,462,278 B1 * | 10/2002 | Vrame | | H02G 3/14 174/66 |
| 6,521,834 B1 * | 2/2003 | Dykhoff | | C09K 21/00 174/66 |
| 6,595,476 B1 * | 7/2003 | Edwards | | E04B 9/006 248/200.1 |
| 6,737,576 B1 * | 5/2004 | Dinh | | H02G 3/088 174/480 |
| 6,974,910 B2 | 12/2005 | Rohmer | | |
| 7,075,009 B1 | 7/2006 | Rohmer | | |
| 7,097,474 B1 * | 8/2006 | Naylor | | H01R 13/6397 174/67 |
| 7,265,291 B1 * | 9/2007 | Gorman | | H02G 3/086 174/66 |
| 7,541,541 B1 * | 6/2009 | Baldwin | | H02G 3/14 174/66 |
| 7,633,009 B1 * | 12/2009 | Baldwin | | H02G 3/14 174/66 |
| 7,683,257 B1 | 3/2010 | Shotey et al. | | |
| 7,763,799 B2 | 7/2010 | Johnson | | |
| 7,851,703 B2 * | 12/2010 | Drane | | H05K 5/061 174/50 |
| 7,910,827 B2 * | 3/2011 | Hur | | H02G 3/14 174/53 |
| 7,947,903 B2 * | 5/2011 | Peck | | H02G 3/14 174/66 |
| 8,022,298 B2 * | 9/2011 | Husain | | H01R 13/5213 174/53 |
| RE43,156 E | 2/2012 | Lindenstraus et al. | | |
| 8,222,522 B1 * | 7/2012 | Easthouse | | H02G 3/14 174/66 |
| 8,344,251 B2 * | 1/2013 | Eshelman | | H02G 3/14 174/66 |
| 8,399,765 B1 * | 3/2013 | Baldwin | | H02G 3/14 174/67 |
| 8,497,424 B2 * | 7/2013 | Castaldo | | H02G 3/14 174/50 |
| 8,759,676 B1 * | 6/2014 | Gretz | | H02G 3/185 174/50 |
| 9,048,645 B1 * | 6/2015 | Gretz | | H02G 3/123 |
| 9,276,389 B1 * | 3/2016 | Elbaz | | H02G 3/14 |
| 9,312,670 B1 * | 4/2016 | Baldwin | | H02G 3/105 |
| 10,069,288 B1 * | 9/2018 | Link | | H02G 3/081 |
| 10,109,989 B1 * | 10/2018 | Baldwin | | H02G 3/04 |
| 2001/0009218 A1 * | 7/2001 | Emaus | | E04B 2/7425 198/813 |
| 2002/0125247 A1 * | 9/2002 | Kruer | | H02G 3/121 220/3.5 |
| 2005/0082081 A1 * | 4/2005 | Marcou | | H02G 3/088 174/67 |
| 2005/0155784 A1 * | 7/2005 | Perkins | | H02G 3/126 174/66 |
| 2006/0231282 A1 * | 10/2006 | Greenfield | | H02G 3/14 174/67 |
| 2007/0175649 A1 * | 8/2007 | Moselle | | A62C 2/065 174/50 |
| 2007/0235204 A1 * | 10/2007 | Lemke | | H02G 3/14 174/50 |
| 2008/0179073 A1 * | 7/2008 | Drane | | H02G 3/088 174/67 |
| 2008/0293293 A1 * | 11/2008 | Drane | | H02G 3/14 439/536 |
| 2008/0296039 A1 * | 12/2008 | Dinh | | H02G 3/14 174/58 |
| 2009/0178823 A1 * | 7/2009 | Pinkowski | | H02G 3/14 174/66 |
| 2009/0224423 A1 * | 9/2009 | Vigorito | | H05K 5/02 264/272.15 |
| 2009/0272558 A1 * | 11/2009 | Compagnone, Jr. | | H02G 3/126 174/58 |
| 2009/0295103 A1 * | 12/2009 | Ebina | | C04B 35/536 277/650 |
| 2010/0000757 A1 * | 1/2010 | Husain | | H01R 13/5213 174/58 |
| 2010/0032180 A1 * | 2/2010 | Korcz | | H02G 3/126 174/50 |
| 2010/0170711 A1 * | 7/2010 | Johnson | | H02G 3/123 174/503 |
| 2011/0109050 A1 * | 5/2011 | Kovacs | | A62C 3/16 277/627 |
| 2011/0290625 A1 * | 12/2011 | Castaldo | | H01H 21/04 200/297 |
| 2012/0111597 A1 * | 5/2012 | Korcz | | H02G 3/14 174/67 |
| 2013/0078853 A1 * | 3/2013 | Dinh | | H02G 3/14 439/535 |
| 2013/0192869 A1 * | 8/2013 | Drane | | H02G 3/185 174/67 |
| 2014/0182876 A1 * | 7/2014 | Trojanowski | | H02G 3/14 174/66 |
| 2014/0367136 A1 * | 12/2014 | Trojanowski | | H02G 3/14 174/66 |
| 2015/0270693 A1 * | 9/2015 | Thornton | | H01R 13/5219 174/50 |

(56) References Cited

U.S. PATENT DOCUMENTS

| | | | |
|---|---|---|---|
| 2016/0204588 A1* | 7/2016 | Trojanowski | H02G 3/14 |
| | | | 174/66 |
| 2017/0047717 A1* | 2/2017 | Thomas | H02G 3/088 |
| 2018/0048132 A1* | 2/2018 | Dinh | H05K 5/0226 |
| 2020/0266615 A1* | 8/2020 | Jagtap | H02G 3/086 |

* cited by examiner

SAFETY COVER FOR ELECTRICAL BOX MOUNTED DEVICE AND METHODS THEREOF

FIELD OF THE INVENTION

This invention relates to a safety cover for an electrical box mounted device. In particular, the safety cover is configured to be mounted between the device and a face plate to prevent access to exposed wires and energized terminals inside the electrical box when the face plate is removed.

BACKGROUND OF THE INVENTION

Electrical boxes are commonly mounted to a stud or other support structure for supporting an electrical device and enclosing electrical wiring. The electrical boxes are often mounted in a variety of positions and locations in the wall, floor, or ceiling for interior and exterior use.

Mounted to the electrical boxes are devices, such as electrical receptacles, switches, dimmers, etc. Those devices are herein referred to as electrical box mounted devices or electrical devices. The electrical box mounted device are electrically connected to wires in the interior of the electrical box and covered by a face plate. The purpose of the face plate is to provide a decorative cover, as well as to prevent access to the interior of the wall box which contains electrical wiring. The face plates are typically attached by one or more screws that extend through a screw hole in the face plate and are threaded into the electrical device. Standard face plates have one or more openings large enough so that functional parts of the electrical box mounted device, such as switch(es), electrical receptacle(s), GFCI switch(es), GFCI receptacle(s), etc., are accessible therethough without providing access to the interior of the electrical box. When the face plate is removed, either intentionally or accidentally (e.g. broken face plate), for example during painting, patching, wall papering, or renovating of the wall, it is possible for a person to gain access to the interior of the wall box due to uncovered openings between the electrical device and the sides of the electrical box. This creates a dangerous situation, particularly for children or pets who are unaware of the danger and may poke foreign objects or their fingers into the electrical box.

Therefore, there remains a need for a safety cover which prevents access to the exposed energized wires and terminals inside the electrical box, when the face plate is removed.

SUMMARY OF THE INVENTION

Accordingly, an aspect of the present invention provides a safety cover for an electrical box mounted device. The safety cover is mounted between the electrical device and a face plate to prevent access to exposed wires and terminals inside the electrical box in case the face plate is removed, broken, or missing. In particular, the safety cover contains a front surface configured to mount between the electrical device and a face plate. The safety cover also contains side surfaces extending approximately perpendicularly from the front surface. The side surfaces are configured to extend into the electrical box to cover the terminal posts and prevent access thereto.

Another aspect of the present invention provides an electrical assembly containing an electrical box, an electrical device mounted to the box, a face plate covering the opening of the electrical box, and the safety cover mounted between the electrical device and the face plate so that the side surfaces of the safety cover extend into the interior of the electrical box to cover the terminal posts and electrical wiring connected to the terminal posts.

Methods for making and using the different aspects of the present invention are also provided.

Other aspects of the invention, including apparatuses, devices, kits, processes, and the like which constitute part of the invention, will become more apparent upon reading the following detailed description of the exemplary embodiments.

BRIEF DESCRIPTION OF THE DRAWINGS

The foregoing background and summary, as well as the following Detailed Description, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION

The exemplary embodiment of the present invention will now be described with the reference to accompanying drawings. The following description of the preferred embodiment is merely exemplary in nature and is in no way intended to limit the invention, its application, or uses.

For purposes of the following description, certain terminology is used in the following description for convenience only and is not limiting. The characterizations of various components and orientations described herein as being "vertical", "horizontal", "upright", "right", "left", "side", "top", "bottom", or the like designate directions in the drawings to which reference is made and are relative characterizations only based upon the particular position or orientation of a given component as illustrated. These terms shall not be regarded as limiting the invention. The words "downward" and "upward" refer to position in a vertical direction relative to a geometric center of the apparatus of the present invention and designated parts thereof. The terminology includes the words above specifically mentioned, derivatives thereof and words of similar import.

Figure 1:
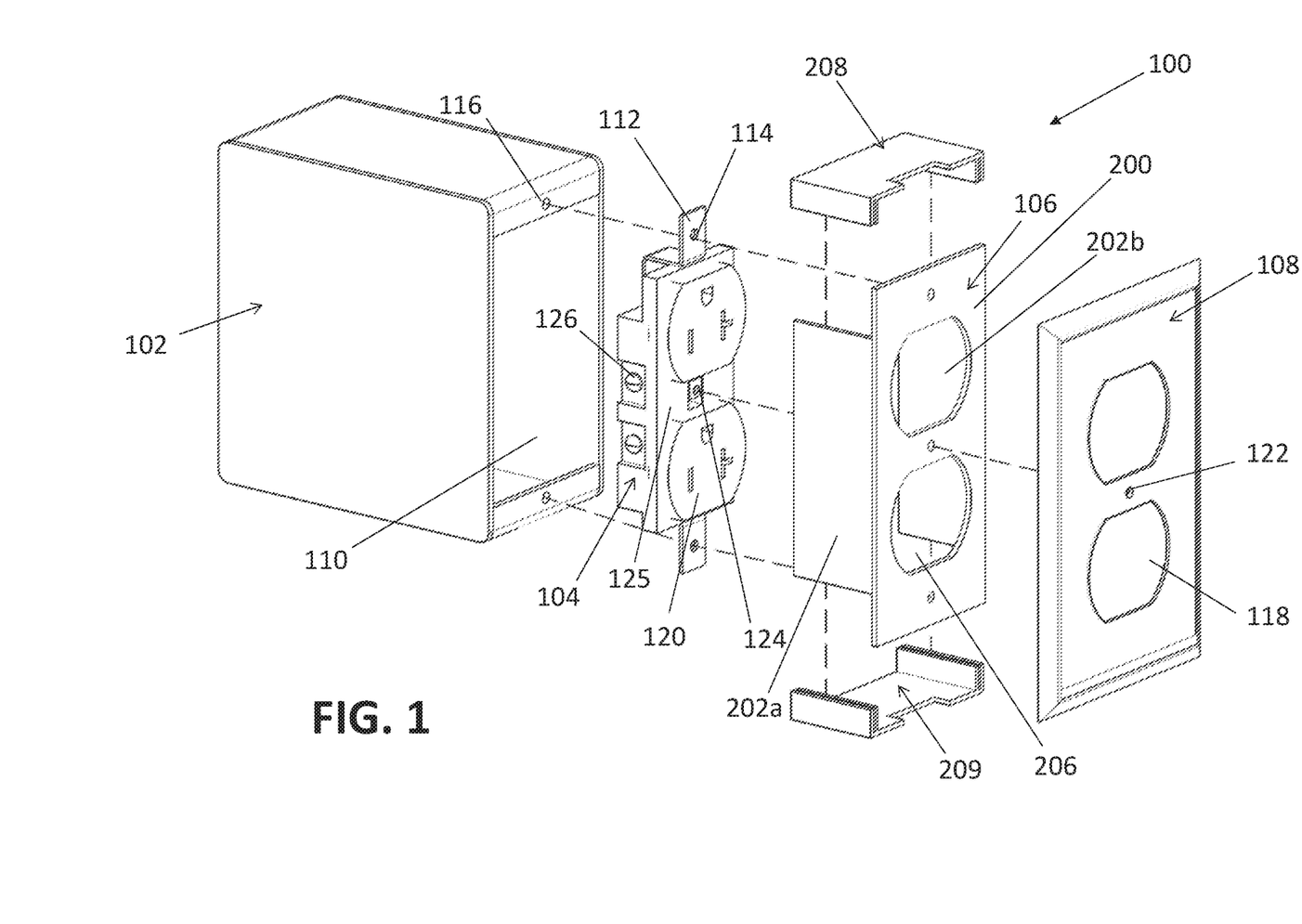
FIG. 1 is an exploded view of an electrical assembly for a common electrical receptacle.
Figure 2:
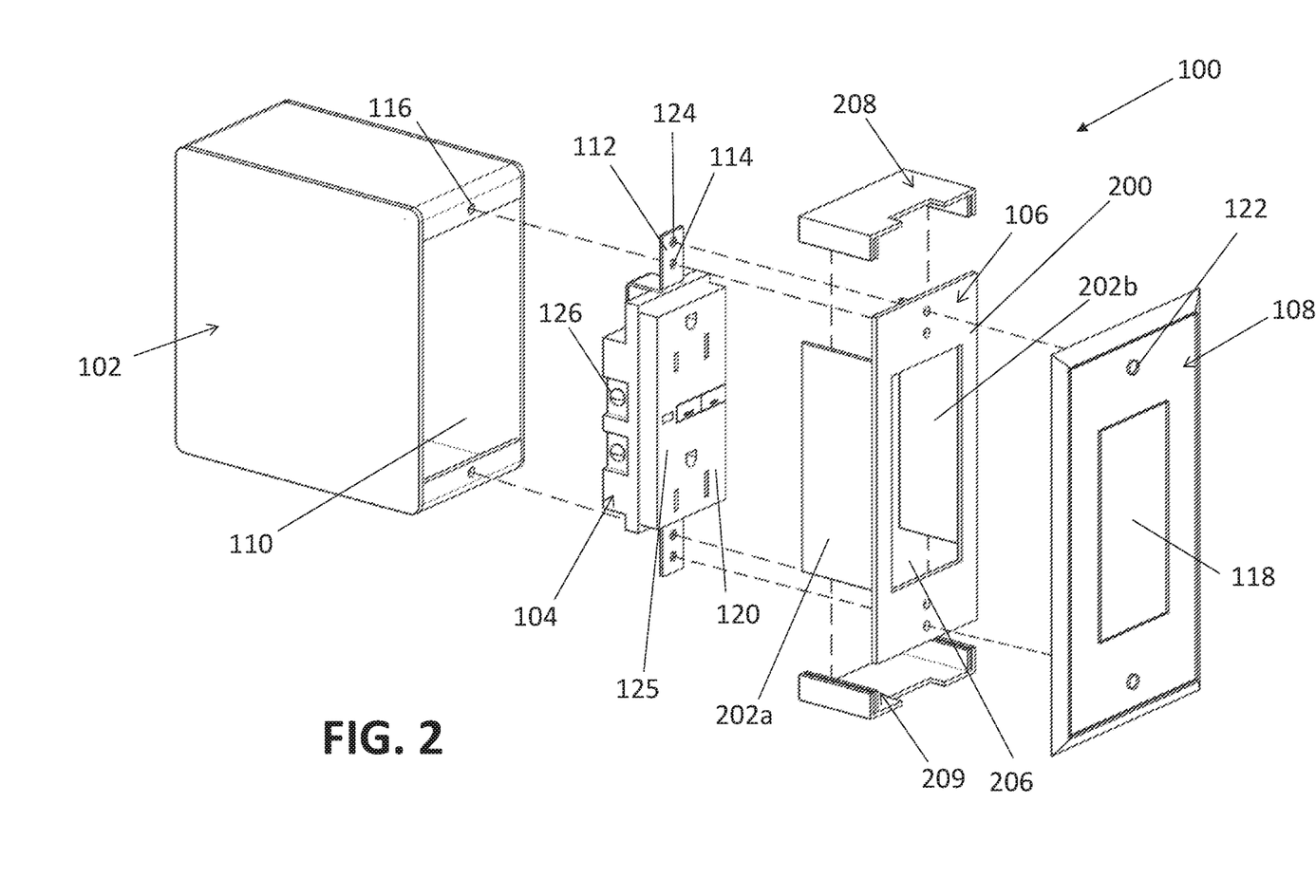
FIG. 2 is an exploded view of an electrical assembly for a GFCI electrical receptacle.
Figure 3:
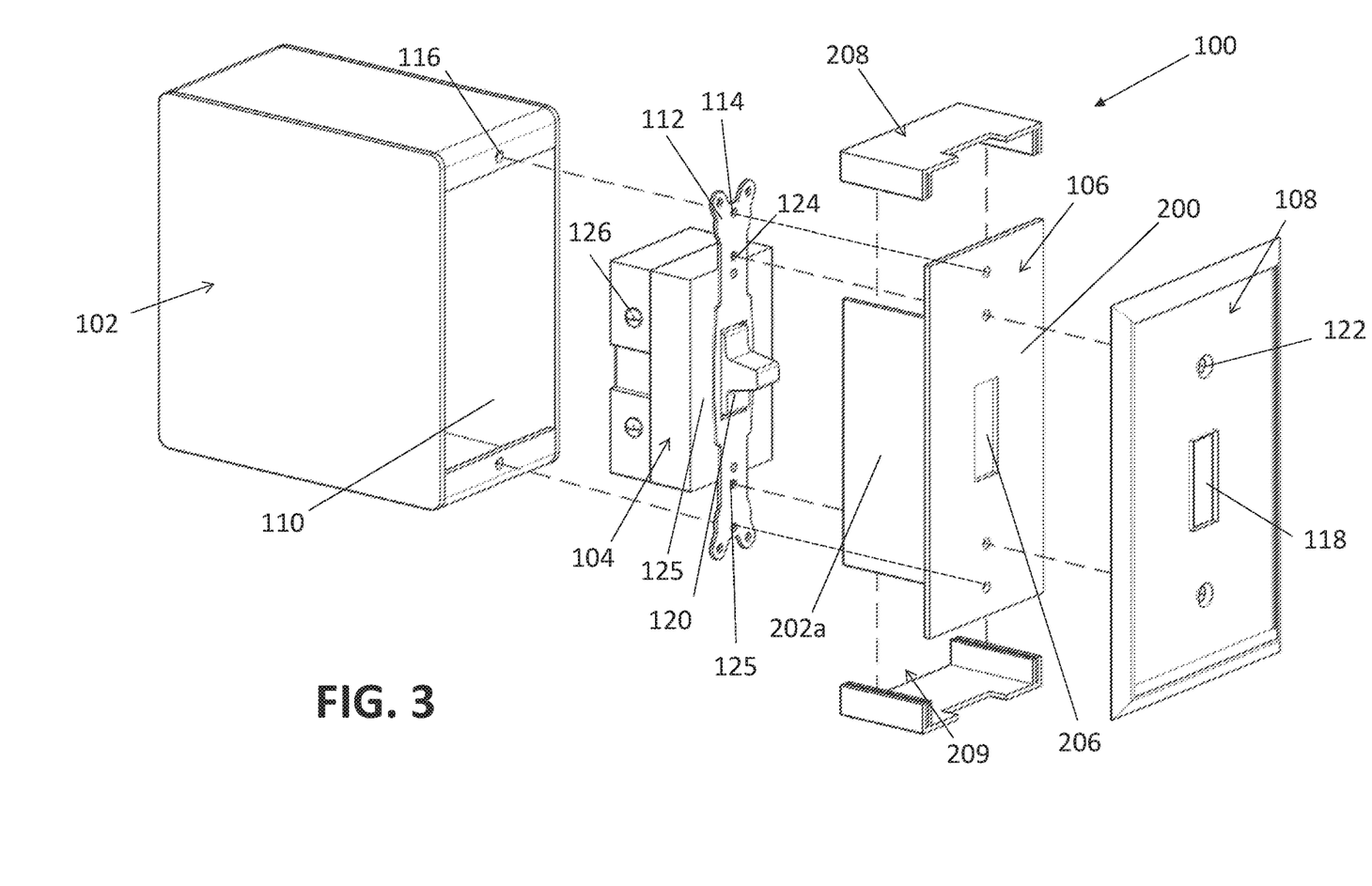
FIG. 3 is an exploded view of an electrical assembly for a toggle switch.

Referring to FIGS. 1-3 which shows an electrical assembly 100 containing an electrical box 102, an electrical device 104 mounted to the electrical box 102, a safety cover 106, and a wall plate 108. Exemplary electrical assemblies 100 are shown in FIGS. 1-3. FIGS. 1-3 shows the electrical assemblies 100 for some common electrical devices 104, such as a common electrical receptacle (FIG. 1), a GFCI electrical receptacle (FIG. 2), and a toggle electrical switch (FIG. 3). Other electrical devices 104 are also known in the art and are also contemplated by the present invention. The electrical box 102 may be a standard construction for attachment to a wall, floor, ceiling, stud or other support structure. Typically, the electrical box 102 is typically located in an opening of a wall, floor, or ceiling with its open end 110 facing the into a room. The electrical device 104 is mounted within electrical box 102 and connected to suitable wiring. The electrical device 104 preferably includes a mounting tab 112 for attaching the electrical device 104 to the electrical box 102. The mounting tab 112 includes a hole 114 for receiving a screw therethrough for treaded engagement to a threaded hole 114 on the electrical box 102. The sides, preferably lateral sides, of the electrical device 104 contains terminal posts 126 for suitable wiring. The drawings illustrate a single gang electrical box 102; however, the electrical box 102 may also be a multiple gang box.

The face plate 108 is placed over the wall opening to cover the wall opening and the electrical box 102 to prevent access to the interior of the electrical box 102. The face plate 108 includes one or more openings 118 corresponding substantially to functional part 120 of the electrical device 104, so that the functional part 120 can extend through the opening 118 or be accessible therethrough. The face plate 108 may typically be attached to the electrical device 104. Usually, the face plate 108 typically contains a hole 122 for receiving a crew therethrough for treaded engagement to a threaded hole 124 on the electrical device 104. In certain embodiments, the face plate 108 may also be screwed to the electrical box 102.

Figure 4:
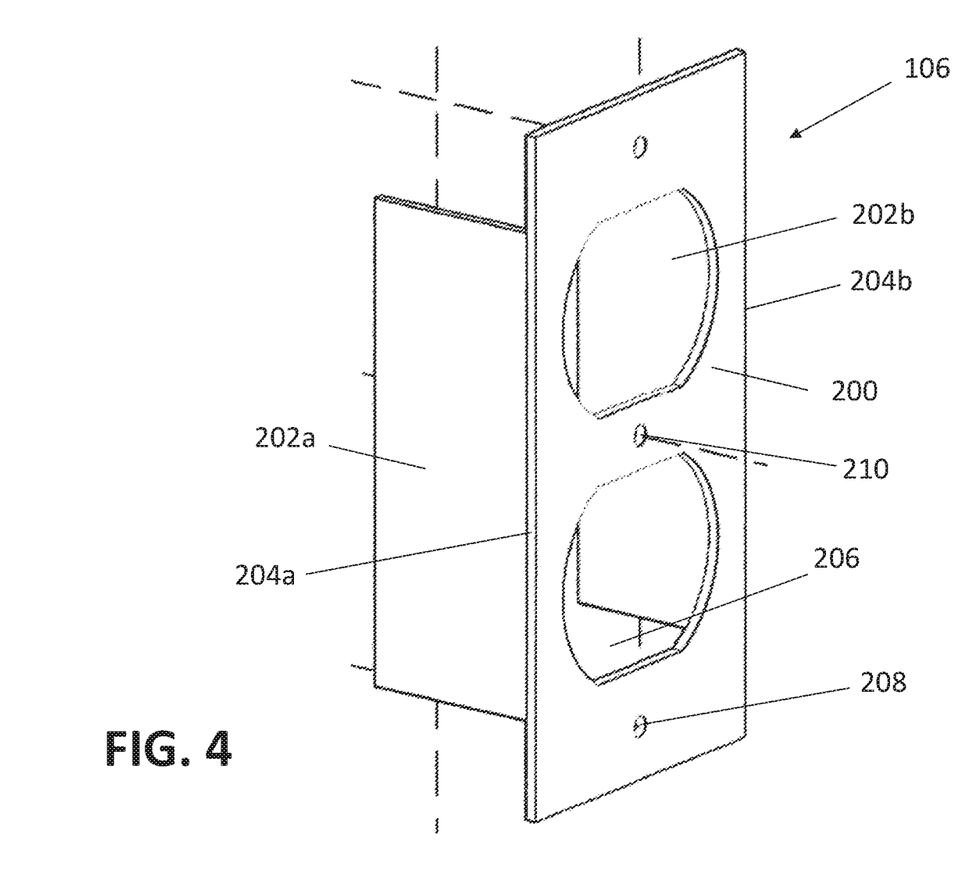
FIG. 4 is a perspective view of a safety cover for a common electrical receptacle.
Figure 5:
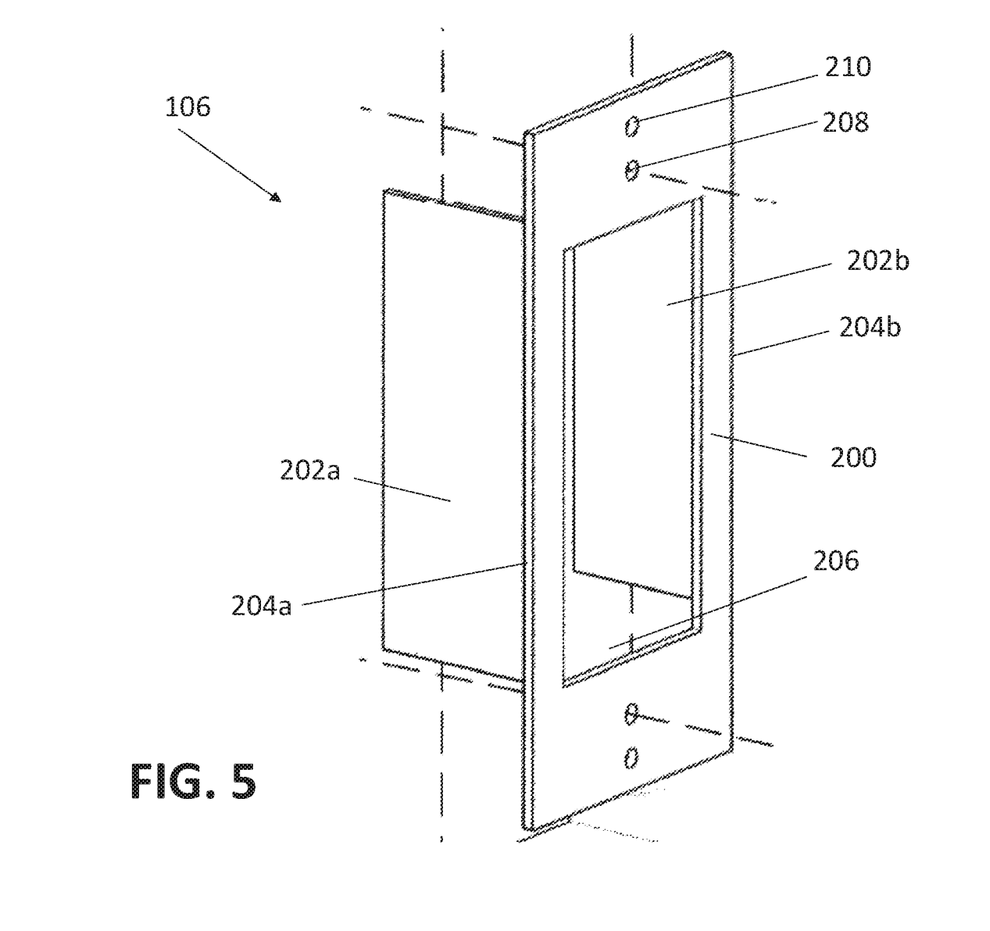
FIG. 5 is a perspective view of a safety cover for a GFCI electrical receptacle.
Figure 6:
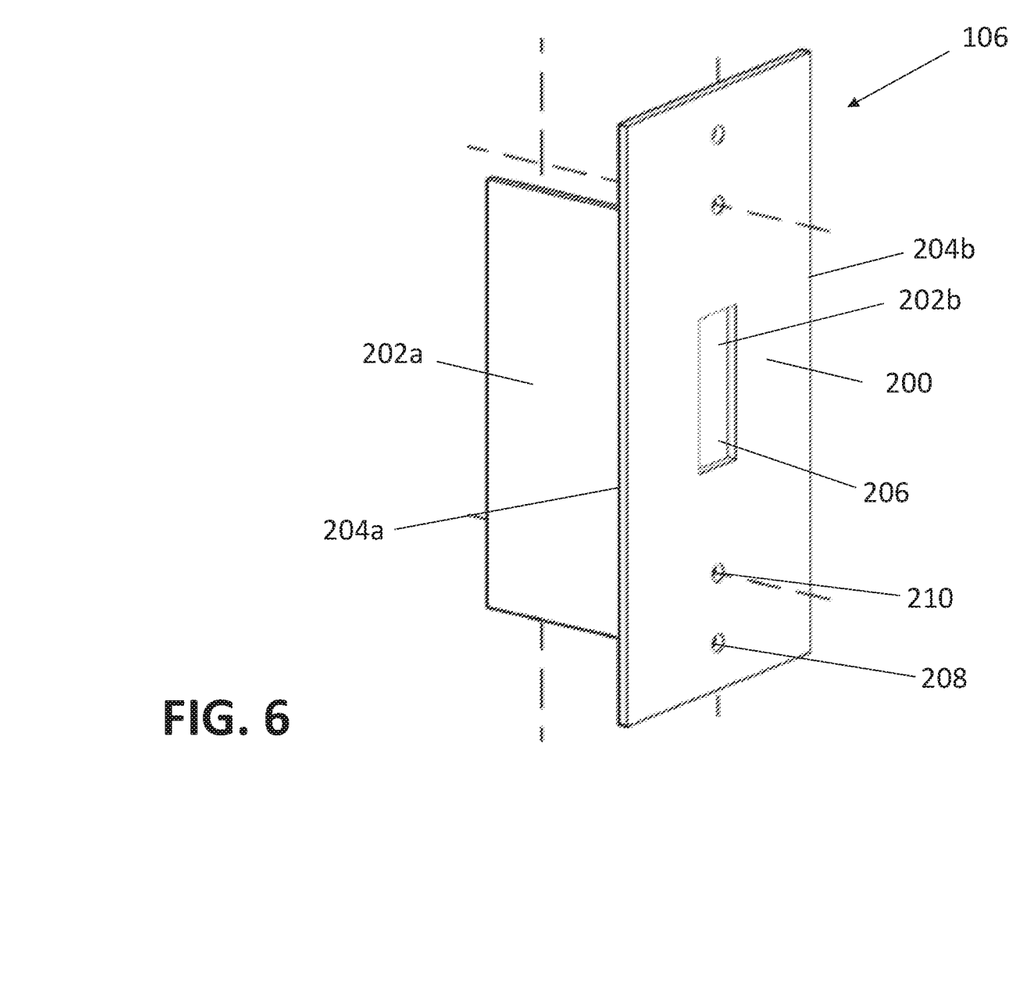
FIG. 6 is a perspective view of a safety cover for a toggle switch.

The electrical assembly 100 according to the present invention includes a safety cover 106 mounted between the face plate 108 and the electrical device 104. The safety cover 106 prevents access to the terminal posts 126 which is connected to exposed wires inside the electrical box 102. Exemplary safety covers 106 are shown in FIGS. 4-6. Like the face plate 108, the safety cover 106 is tailored to the particular type of electrical device 104 being installed. FIGS. 4-6 shows the safety cover 106 for a common electrical receptacle, a GFCI electrical receptacle, and a toggle switch, respectively. However, other electrical devices 104 may also be used with the present safety cover 106. The safety cover 106 generally contains a substantially planar front surface 200 and substantially planar side surfaces 202a and 202b extending perpendicularly to the front surface 200. The first side surface 202a extends approximately perpendicularly from a first lateral side 204a of the front surface 200. The second side surface 202b extends approximately perpendicularly from a second lateral side 204b of the front surface 200. The first and second side surfaces 202a and 202b extend from the front surface 200 in the same direction. As such, because the first and second lateral sides 204a and 204b of the front surface 200 oppose each other, the first and second side surfaces 202a and 202b also oppose each other. The safety cover 106 is designed to fit around the electrical device 104, such that the front surface 200 fits over a front face 125 of the electrical device 104 and the lateral sides 202a and 202b sufficiently extend into electrical box 102 to cover the terminal posts 126 on the sides of the electrical device 104. Preferably, the width of the safety cover 106 is the same as or slightly greater than the width of the electrical device 104, preferably about 12-18 mm greater, such that, when properly installed, the side surfaces 202a and 202b are positioned adjacent to the terminal posts 126 on the sides of the electrical device 104. That way, the terminal posts 126 and their attached exposed wires are not accessible when the face plate 108 is removed.

As illustrated in the drawings, the side surfaces 202a and 202b need not extend the full length of the front surface 200 as long as it is sufficient to cover terminal posts 126 and their corresponding exposed wires. Preferably, the side surfaces 202a and 202b extend only the middle 50% to 80% of the length of the front surface. In certain embodiments, however, the side surfaces 202a and 202b may extend the full length of the front surface 200. The front surface 200 includes one or more openings 206 matching the one or more openings 118 of the face plate 108 to allow functional part 120 of the electrical device 104 to extend or be accessible therethrough. Preferably, the one or more openings 206 of the safety cover 106 are identical to and in register with the one or more openings 118 of the face plate 108, when the safety cover 106 and the face plate 108 are assembled in the electrical assembly 100.

Figure 7:
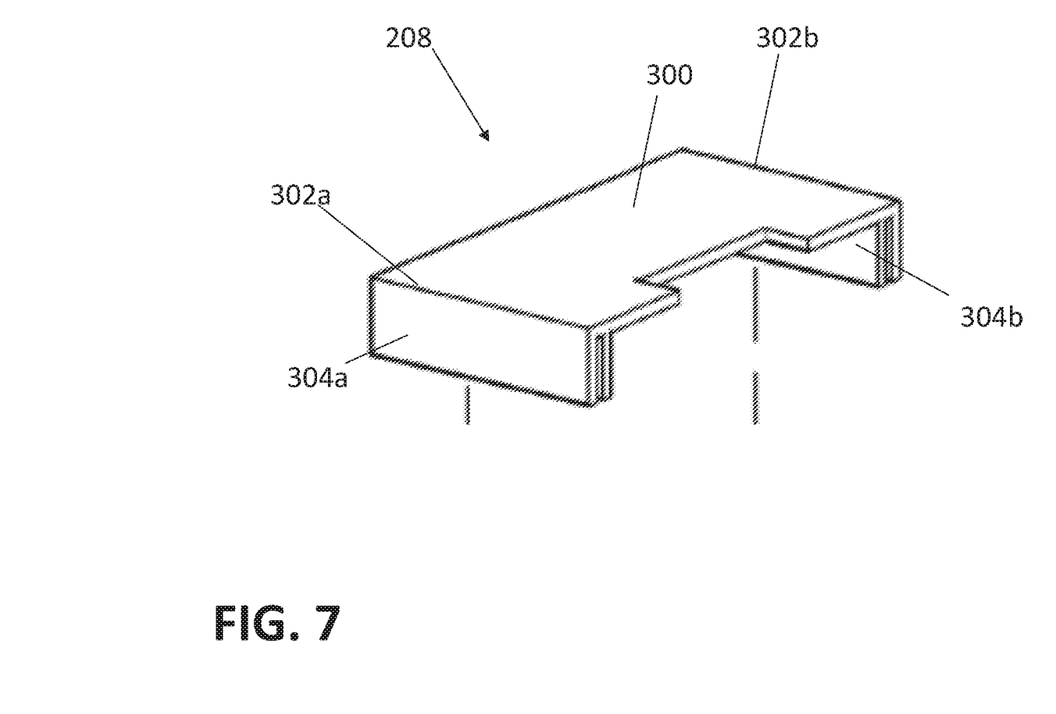
FIG. 7 is a perspective view of a top cap.

Referring to FIGS. 1-3, in certain embodiments, top and bottom caps 208 and 210 may also be fitted on to the safety cover 106. The top and bottom caps 208 and 210 provide additional protection, and in certain situation, may provide fire protection properties, e.g. UL 2 hour rating (2019). The top cap 208 attaches to and bridges the top of the side surfaces 202a and 202b. The bottom cap 210 attaches to and bridges the bottom of the side surfaces 202a and 202b. The top and bottom caps 208 and 210 are mirror images of each other; therefore, only the top cap 208 is described in detail herein with the understanding that its mirror image forms the bottom cap 210. Referring to FIG. 7, the top cap 208 contains a substantially planar top wall 300. The first side 302a of the top wall 300 contains a first double wall 304a extending downwardly and perpendicular to the top wall 300. The second side 302b of the top wall 300 (opposing the first side edge 302a) contains a second double wall 304b extending downwardly and perpendicular to the top wall 300. The first and second double walls 304a and 304b oppose each other and are configured to mate with the side surfaces 202a and 202b of the safety cover 106, such that a top portion of the first side surface 202a fits securely between the first double walls 304a, and a top portion of the second side surface 202b fits between the second double walls 304b. When in place, the top portion of the first side surface 202a slides between the first double wall 304a and is retained therebetween by pressure exerted by the first double wall 304a on the first side surface 202a. The same occurs with the second side surface 202b and its corresponding second double wall 304b. The bottom cap 210 is similarly mated to a bottom portion of the first and second side surfaces 202a and 202b.

The safety cover 106 and/or caps 208 and 210 may be made of the same or different materials. Preferably, the material for the safety cover 106 is electrically insulative. The preferred material is a thermoplastic such as, but is not limited to, polyethylene (PE), polypropylene, (PP), polyvinyl chloride (PVC), or combinations thereof. Most preferably, the safety cover 106 is made of PVC. The safety cover 106 and/or caps 208 and 210 may be made using techniques known in the art, including but not limited to, molding, 3D printing, extrusion, or combinations thereof. Preferably, the safety cover 106 is formed as a single, unitary piece.

The dimensions of the safety cover 106 should be based on the dimensions of the electrical device that is being used. Preferably, the front surface 200 of the safety cover has a width of about 45-49 mm and a length of about 96-107 mm. Preferably, the side surfaces 202a and 202b extend from the front surface a distance of 200 about 25-46 mm.

In use, the safety cover 106 may be placed over the electrical device 104 using the same screws used to mount the electrical device 104 to the electrical box 102. The safety cover 106 may include one or more holes 208 which are in alignment with holes 114 of the mounting tab 112 on the electrical device 104. Screws may be placed through holes 208 and holes 114, then crew into the threaded holes 116 of the electrical box 102 to hold the safety cover 106 and the electrical device 104 in place. The face plate 108 may then be attached as known in the art. Preferably, the safety cover contains a pass-through hole 210 in alignment with the hole 122 of the face plate 108 and the treaded hole 124 of the electrical device 104 to allow for easy mounting of the face plate 108 to the electrical device 104. A skilled person in the art would be familiar with different ways to assemble the electrical device 104 and the face plate 108, and therefore, with the description herein, would have been able to design different ways to attach the safety cover 106. Over all, the safety cover 106 contains through hole(s) 208 (see FIGS. 4-6) to allow the screw(s) attaching the electrical device 104 to the electrical box 102 to hold the safety cover 106 in place over the electrical device 104. Through hole(s) 210 allows the face plate 108 to be screwed to the electrical device 104. That way, when the face plate 108 is removed, the safety cover 106 remains in place over the electrical device.

Although the drawings show embodiments of the present invention for a common electrical receptacle, a GFCI electrical receptacle, and a toggle switch, other electrical devices are also contemplated by the present invention. As known in the art, the face plate 108 must match the particular electrical device, so too must the safety cover 106. For use with other electrical devices, the opening 206 of the safety cover 106 must be designed to match the particular electrical device, in a similar manner to the face plate 108.

Although certain presently preferred embodiments of the invention have been specifically described herein, it will be apparent to those skilled in the art to which the invention pertains that variations and modifications of the various embodiments shown and described herein may be made without departing from the spirit and scope of the invention.

What is claimed is:

1. A safety cover for a mounted device mounted to an electrical box with screws, the safety cover comprising
   a) a planar front surface having holes adapted to mount the safety cover to the device using the same screws that are used to mount the device to the electrical box;
   b) a first side surface extending approximately perpendicularly from the front surface;
   c) a second side surface extending approximately perpendicularly from the front surface in the same direction as the first side, wherein the front surface is configured to fit over the front of the device and the first and second sides are configured to cover terminal posts on the lateral sides of the device, and wherein the front surface and first and second side surfaces formed a monolithic piece of an insulative material; and
   wherein the planar front surface, the first side surface, and the second side surface of the safety cover, in combination, prevent access to a plurality of exposed energized wires and terminals inside the electrical box when the face plate is removed.

2. The safety cover of claim 1, wherein the width of the safety cover is approximately the same or slightly greater than the width of the device.

3. The safety cover of claim 1, wherein the first and second sides extend from opposing side edges of the front surface.

4. The safety cover of claim 1, wherein each of the side surfaces extends the middle 50 to 80% of the length of the front surface.

5. The safety cover of claim 1, wherein the front surface has one or more openings matching one or more functional parts of the device.

6. The safety cover of claim 5, wherein the one or more function parts of the device extends through the one or more openings.

7. The safety cover of claim 1, wherein the device is an electrical receptacle, a switch, or a dimmer.

8. The safety cover of claim 1, further comprising a top cap attaching to and bridging the top of the first and second side surfaces, and a bottom cap attaching to and bridging the bottom of the first and second side surfaces.

9. The safety cover of claim 8, wherein the top and bottom caps are mirror images of each other.

10. An assembly comprising an electrical box, an electrical device mounted to the electrical box with screws, and the safety cover of claim 1 mounted to the device using the same screws, wherein the front surface fits over the front of the device and the first and second side surfaces cover terminal posts on the lateral sides of the device.

11. The assembly of claim 10, further comprising an electrical box, the electrical device and the safety cover are mounted to the electrical box, wherein the first and second side surfaces extend into the interior of the electrical box.

12. The assembly of claim 11, further comprising a face plate covering a front opening of the electrical box and the front surface.

13. The assembly of claim 10, wherein the width of the safety cover is approximately the same or slightly greater than the width of the device.

14. The assembly of claim 10, wherein the first and second sides extend from opposing side edges of the front surface.

15. The assembly of claim 10, wherein each of the side surfaces extends the middle 50 to 80% of the length of the front surface.

16. The assembly of claim 10, wherein the front surface has one or more openings matching one or more functional parts of the device.

17. The assembly of claim 10, wherein the device is an electrical receptacle, a switch, or a dimmer.

18. The assembly of claim 10, wherein the safety cover is made of an electrically insulative material.

19. A method for installing an electrical assembly in a wall comprising the steps of
   a) installing an electrical device in an electrical box mounted in a hole in the wall, wherein the electrical device is installed in the electrical box with screws;
   b) installing the safety cover of claim 1 over the electrical device using the same screws, such that the front surface fits over the front of the device and the first and second sides surfaces extend into the electrical box to cover terminal posts on the lateral sides of the device.

* * * * *